(12) United States Patent
DeChristopher et al.

(10) Patent No.: US 12,369,512 B2
(45) Date of Patent: Jul. 29, 2025

(54) AGRICULTURAL HEADER WITH FOLDABLE TRANSPORT WHEEL ASSEMBLY

(71) Applicant: CNH Industrial America LLC, New Holland, PA (US)

(72) Inventors: David M. DeChristopher, Ephrata, PA (US); Renato Ribeiro, Campo Largo (BR); Seth Bietz, Bettendorf, IA (US)

(*) Notice: Subject to any disclaimer, the term of this patent is extended or adjusted under 35 U.S.C. 154(b) by 848 days.

(21) Appl. No.: 17/592,562

(22) Filed: Feb. 4, 2022

(65) Prior Publication Data
US 2022/0240431 A1 Aug. 4, 2022

Related U.S. Application Data

(60) Provisional application No. 63/145,774, filed on Feb. 4, 2021.

(51) Int. Cl.
*A01D 75/00* (2006.01)
*A01B 73/00* (2006.01)

(52) U.S. Cl.
CPC .......... *A01B 73/005* (2013.01); *A01D 75/002* (2013.01)

(58) Field of Classification Search
CPC ..... A01B 73/00; A01B 73/005; A01B 69/007; A01D 75/002; A01D 75/00; B60P 3/066; B62D 13/04
See application file for complete search history.

(56) References Cited

U.S. PATENT DOCUMENTS

| | | | | |
|---|---|---|---|---|
| 3,721,461 A * | 3/1973 | Nelsen | .................. | A01B 73/005 172/240 |
| 3,763,637 A * | 10/1973 | Schmitt | ................ | A01D 75/002 56/228 |
| 3,919,831 A * | 11/1975 | Halls | ..................... | A01D 67/005 56/228 |
| 7,197,865 B1 * | 4/2007 | Enns | ...................... | A01D 41/14 56/228 |
| 7,552,579 B2 * | 6/2009 | Tippery | ............... | A01B 73/005 56/228 |
| 10,405,481 B2 * | 9/2019 | Chen | ..................... | A01D 75/002 |
| 10,980,181 B2 * | 4/2021 | Sudbrack | ................ | B60P 3/066 |
| 11,490,564 B2 * | 11/2022 | LaVally | ............... | A01B 73/005 |

(Continued)

FOREIGN PATENT DOCUMENTS

| EP | 3669625 A1 | 6/2020 |
|---|---|---|
| FR | 2763782 A1 | 12/1998 |
| FR | 2924303 A1 | 6/2009 |

*Primary Examiner* — Adam J Behrens
(74) *Attorney, Agent, or Firm* — Rebecca Henkel; Rickard K. DeMille; Peter K. Zacharias

(57) ABSTRACT

An agricultural header for an agricultural vehicle includes: a header frame; at least one cutter carried by the header frame and configured to cut crop material; and a transport assembly coupled to the header frame. The transport assembly includes: a first arm coupled to the header frame and including a first wheel mount configured to mount a first transport wheel thereto; a second arm pivotably coupled to the header frame and including a second wheel mount configured to mount a second transport wheel thereto; and a cross arm coupling the first arm to the second arm. The cross arm is releasably coupled to the first arm such that the cross arm and the second arm are slideable and nestable with one another when the cross arm is uncoupled from the first arm.

20 Claims, 5 Drawing Sheets

(56) References Cited

U.S. PATENT DOCUMENTS

| | | | |
|---|---|---|---|
| 2012/0011822 A1* | 1/2012 | Honas | A01D 75/002 |
| | | | 56/228 |
| 2018/0310462 A1* | 11/2018 | Chen | A01D 41/06 |
| 2020/0008341 A1* | 1/2020 | Madarasi | B25J 5/007 |
| 2021/0307247 A1* | 10/2021 | Lyons | A01D 75/004 |

* cited by examiner

AGRICULTURAL HEADER WITH FOLDABLE TRANSPORT WHEEL ASSEMBLY

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Many known headers have operating widths of 40 feet or greater that make the headers unsuitable for transport on public roads in the operating position. In order to transport such headers on public roads, the header must be transported at an orientation that is perpendicular to the normal operating orientation. To stabilize the header in the transport orientation, one or more transport wheel assemblies are deployed. While such transport wheel assemblies are effective, deploying the assemblies, and storing the assemblies when they are no longer needed, is often cumbersome. Automatic systems have been developed to deploy and store the transport wheel assemblies, but these automatic systems can be too expensive and complicated for many users to adopt.

What is needed in the art is an agricultural header that addresses some of the previously described issues with known agricultural headers.

SUMMARY OF THE INVENTION

Exemplary embodiments provided according to the present disclosure include a transport assembly with a first arm and a second arm coupled together by a cross arm, with the second arm and the cross arm being slideable and nestable with one another when the cross arm is uncoupled from the first arm.

In some exemplary embodiments provided according to the present disclosure, an agricultural header for an agricultural vehicle includes: a header frame; at least one cutter carried by the header frame and configured to cut crop material; and a transport assembly coupled to the header frame. The transport assembly includes: a first arm coupled to the header frame and including a first wheel mount configured to mount a first transport wheel thereto; a second arm pivotably coupled to the header frame and including a second wheel mount configured to mount a second transport wheel thereto; and a cross arm coupling the first arm to the second arm, the cross arm being releasably coupled to the first arm such that the cross arm and the second arm are slideable and nestable with one another when the cross arm is uncoupled from the first arm.

In some exemplary embodiments provided according to the present disclosure, an agricultural vehicle includes a chassis and a header carried by the chassis. The header includes: a header frame; at least one cutter carried by the header frame and configured to cut crop material; and a transport assembly coupled to the header frame. The transport assembly includes: a first arm coupled to the header frame and including a first wheel mount configured to mount a first transport wheel thereto; a second arm pivotably coupled to the header frame and including a second wheel mount configured to mount a second transport wheel thereto; and a cross arm coupling the first arm to the second arm, the cross arm being releasably coupled to the first arm such that the cross arm and the second arm are slideable and nestable with one another when the cross arm is uncoupled from the first arm.

One possible advantage that may be realized by exemplary embodiments provided according to the present disclosure is that the transport assembly can be easily and quickly deployed or stored by an operator.

Another possible advantage that may be realized by exemplary embodiments provided according to the present disclosure is that the transport assembly can be easily retrofit to an existing header, adding minimal, if any, cost to a user who has other transport infrastructure components.

Yet another possible advantage that may be realized by exemplary embodiments provided according to the present disclosure is that the components of the transport assembly can stay with the header when the transport assembly is not deployed, reducing the risk of the transport assembly components being lost during operation when the transport assembly is not in use.

Yet another possible advantage that may be realized by exemplary embodiments provided according to the present disclosure is that the transport assembly can be stored with the header, which is convenient.

Yet another possible advantage that may be realized by exemplary embodiments provided according to the present disclosure is that the transport assembly does not require complicated hydraulics and/or control systems to operate, which reduces complexity and cost of the assembly.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
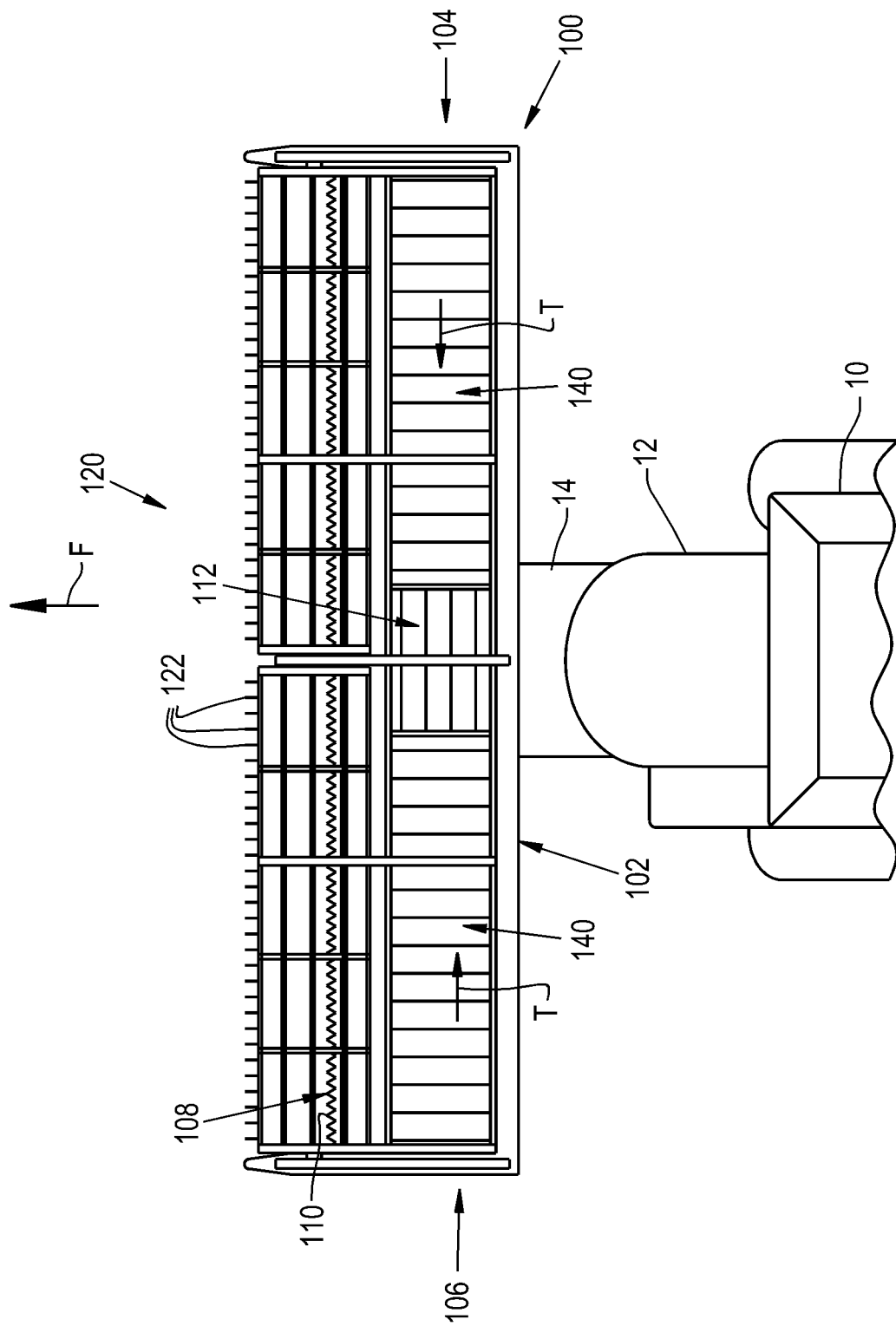
FIG. 1 illustrates a top view of an exemplary embodiment of an agricultural vehicle, the agricultural vehicle comprising an agricultural header, in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of a header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers. Further, while the exemplary embodiment of the header 100 is shown and described as a draper header, it should be appreciated that the header can be formed, in some exemplary embodiments, as an auger-type header incorporating one or more augers as the crop material conveyor(s). It should be further appreciated that while the header 100 is shown and described as being configured for harvesting wheat, in some embodiments the header is configured for harvesting other crops, such as corn.

The header 100 is coupled to the feeder housing 14 and supported by the chassis 12 of the agricultural vehicle 10. The header 100 has a header frame 102 and a pair of opposed lateral ends 104, 106. The header frame 102 supports one or more flexible cutters 108, shown as a cutter bar, with reciprocating cutting edges 110 to cut crop material as the agricultural vehicle 10 travels in a forward direction, denoted by arrow F. The header 100 may further include a center feed belt 112 or a center auger that conveys the crop material into the feeder housing 14. In one exemplary embodiment, the header 100 can include one or more lateral, flexible draper belts 140 that are positioned rearwardly of the cutter bar(s) 108 and travel, i.e. rotate, in opposing directions of travel, denoted by each arrow "T", in order to convey the crop material inwardly to the center feed belt 112 and thereby the feeder housing 14. In some exemplary embodiments, the header 100 may include a pair of counter-rotating cross augers, rather than the draper belts 140, to convey crop material laterally inward toward the center feed belt 112. The vehicle 10 may further include a reel assembly 120 with tines 122 that rotate to direct crop material to the cutter(s) 108 of the header 100, as is known.

Figure 2:
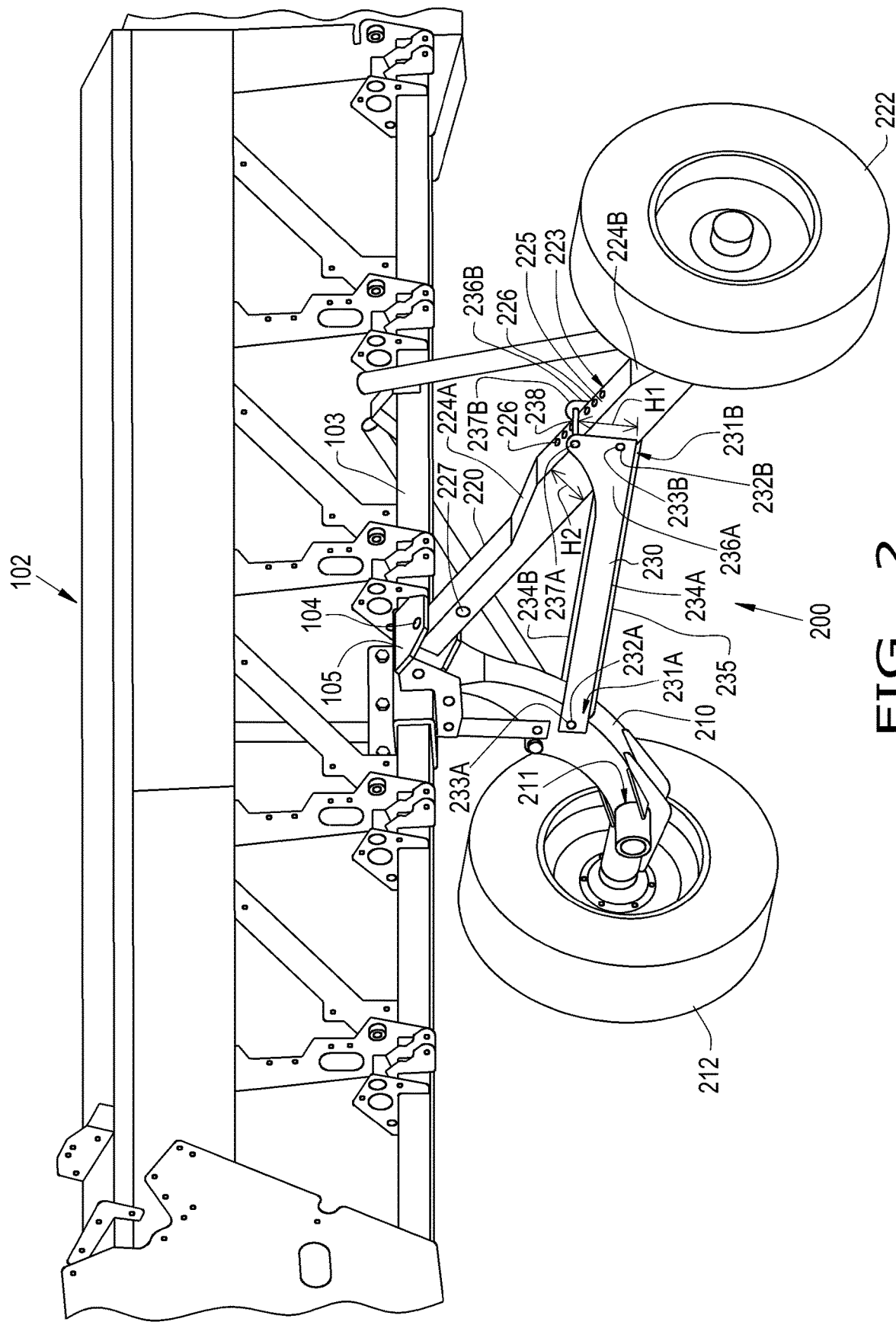
FIG. 2 illustrates an exemplary embodiment of a transport assembly of the header of FIG. 1 in a transport configuration, in accordance with an exemplary embodiment of the present invention.
Figure 3:
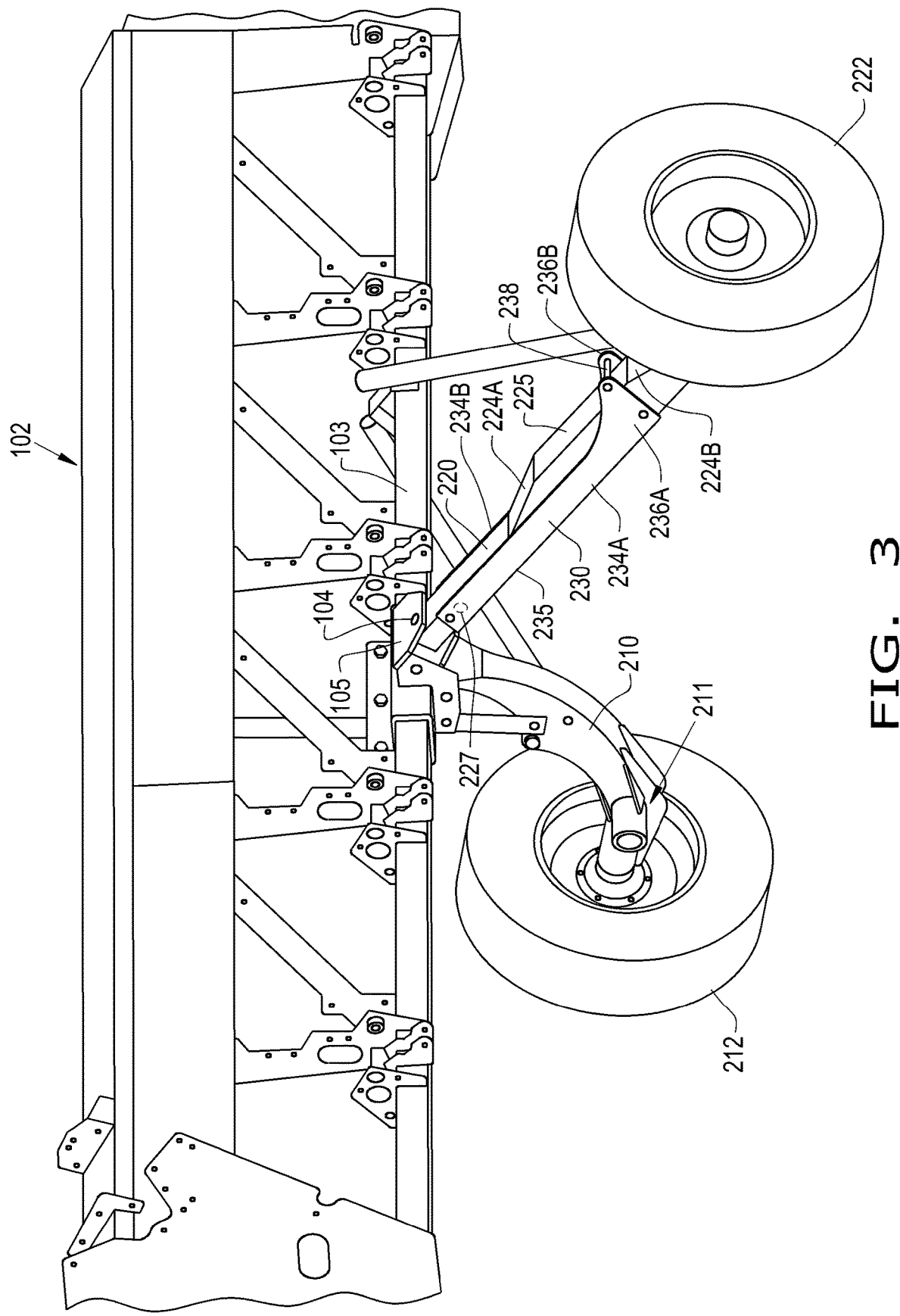
FIG. 3 illustrates the transport assembly of FIG. 2 when a cross arm has been released from a first arm and is being moved to nest and slide with a second arm, in accordance with an exemplary embodiment of the present invention.
Figure 4:
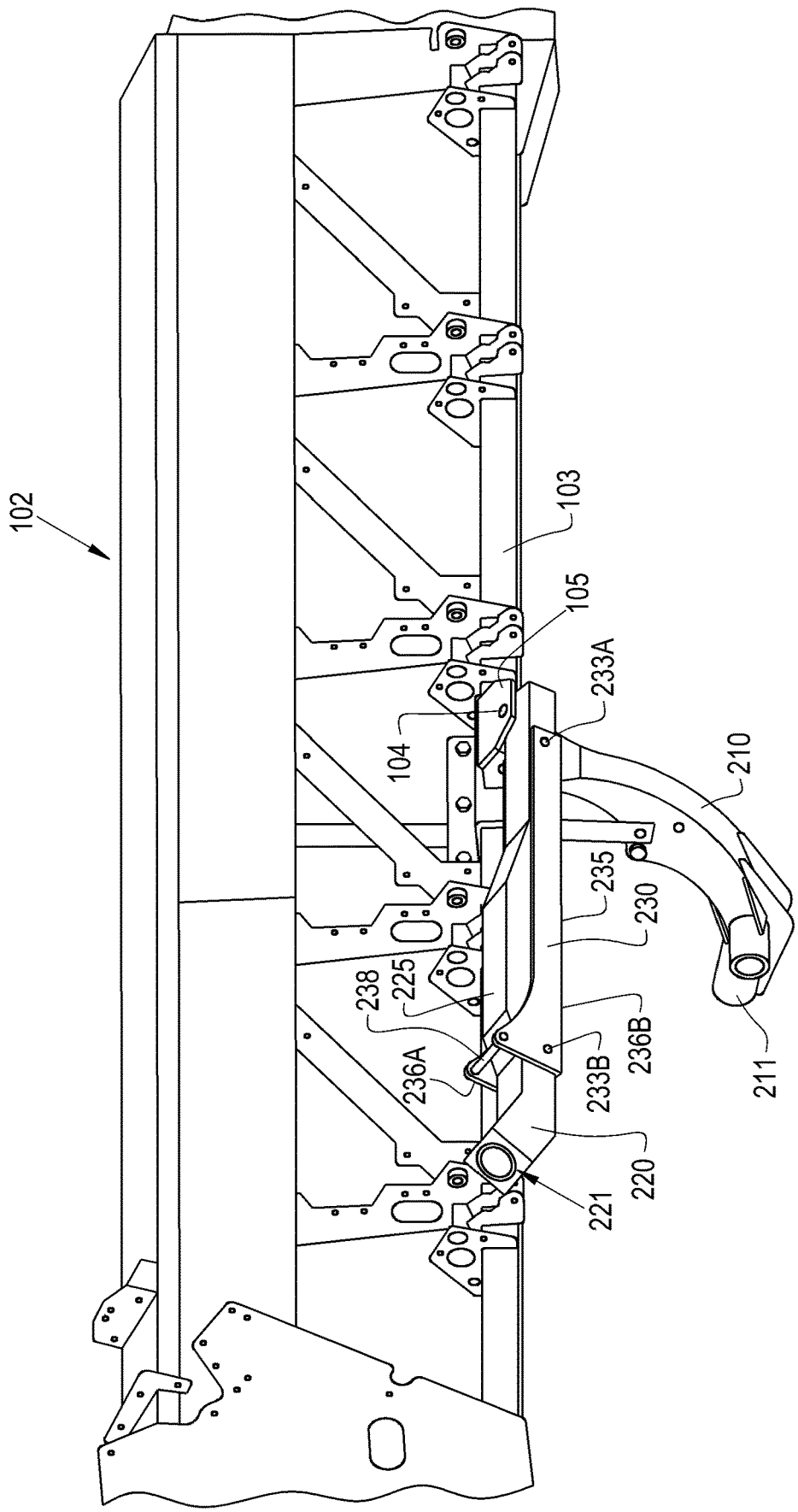
FIG. 4 illustrates the transport assembly of FIGS. 2-3 when the cross arm is in a nesting position and the second arm has been pivoted to an operating position, in accordance with an exemplary embodiment of the present invention.

Referring now to FIGS. 2-4, an exemplary embodiment of a transportation assembly 200 provided according to the present disclosure is illustrated being carried by the header frame 102. The transportation assembly 200 includes a first arm 210 coupled to the header frame 102, a second arm 220 pivotably coupled to the header frame 102, and a cross arm 230 coupling the first arm 210 to the second arm 220. The first arm 210 includes a first wheel mount 211 that is configured to mount a first transport wheel 212 thereto and the second arm 220 includes a second wheel mount 221 that is configured to mount a second transport wheel 222 thereto. The transport wheels 212, 222 are illustrated as being mounted to their respective wheel mounts 211, 221 in FIGS. 2-3, while the wheel mounts 211, 221 are illustrated without any transport wheels 212, 222 mounted thereto in FIG. 4. It should thus be appreciated that the transport wheels 212, 222 are releasably mounted to the wheel mounts 211, 221 and may be released and removed from the wheel mounts 211, 221 when the header 100 is operating to collect crop material, as will be described further herein.

The cross arm 230 coupling the first arm 210 to the second arm 220 is releasably coupled to the first arm 210 such that the cross arm 230 and the second arm 220 are slideable and nestable with one another when the cross arm 230 is uncoupled from the first arm 210. In some embodiments, the cross arm 230 may be locked to the second arm 220 and need to be released before sliding and nesting with the second arm 220, i.e., the cross arm 230 may also be releasably coupled to the second arm 220. As illustrated in FIG. 2, the cross arm 230 may include a pair of opposite end sections 231A, 231B that are each coupled to a respective one of the arms 210, 220. As illustrated, the end section 231A of the cross arm 230 may be coupled to the first arm 210 and the end second 231B of the cross arm 230 may be coupled to the second arm 220. In some embodiments, the end sections 231A, 231B of the cross arm 230 are coupled to their respective arm 210, 220 by a respective pin 232A, 232B placed in openings 233A, 233B formed in the respective end sections 231A, 231B. In some embodiments, removing the pins 232A, 232B from the openings 233A, 233B releases the cross arm 230 from the arms 210, 220, as illustrated in FIG. 3, allowing the cross arm 230 and the second arm 220 to slide and nest with one another, as will be further described herein. It should be appreciated that the cross arm 230 does not necessarily need to be locked to the second arm 220, in which case release of the cross arm 230 to slide and nest the arms 220, 230 is unnecessary. The pins 232A, 232B may be removed from the openings 233A, 233B by pulling the entire pins 232A, 232B out of the openings 233A, 233B or, alternatively, the pins 232A, 232B may be a spring-loaded pin carried by the respective arm 210, 220 that can be depressed to release the cross arm 230. It should thus be appreciated that the cross arm 230 can be releasably coupled to the first arm 210, and in some embodiments the second arm 220 as well, in a variety of ways according to the present disclosure.

When released from the first arm 210, the cross arm 230 is slideable and nestable with the second arm 220. As used herein, the cross arm 230 and the second arm 220 are "slideable" with one another in the sense that the cross arm 230 and the second arm 220 can be slid relative to one another, by sliding the cross arm 230 along the second arm 220 and/or by sliding the second arm 220 along the cross arm 230. Similarly, the cross arm 230 and the second arm 220 are "nestable" with one another in the sense that the second arm 220 nests within the cross arm 230, as illustrated, or the cross arm 230 nests within the second arm 220. As illustrated, the cross arm 230 is pivotably coupled to the second arm 220 so the cross arm 230 is pivotable between a coupling position, illustrated in FIG. 2, where the cross arm couples the first arm 210 to the second arm 220 and a nesting position, illustrated in FIGS. 3-4, where the second arm 220 nests with the cross arm 230, e.g., within the cross arm 230 as illustrated. As previously described, in some embodiments it may be necessary to disengage the pin 232B to slide the cross arm 230 along the second arm 220.

To nest the second arm 220 within the cross arm 230, the cross arm 230 can include a pair of opposed sidewalls 234A, 234B, with the second arm 220 nesting between the sidewalls 234A, 234B when the cross arm 230 is in the nesting position. The sidewalls 234A, 234B may be coupled together by a bottom wall 235 of the cross arm 230 that contacts the second arm 220 when the cross arm 230 is in the nesting position. Each of the sidewalls 234A, 234B may have a respective slide section 236A, 236B that defines a height H1 greater than a maximum height H2 of the second arm 220, as best illustrated in FIG. 2. Each of the slide sections 236A, 236B may also include a respective pin opening 237A, 237B that is placed above the second arm 220 so that when a pin 238 is placed in each of the pin openings 237A, 237B of the slide sections 236A, 236B, the slide sections 236A, 236B and pin 238 together prevent the cross arm 230 from easily coming off the second arm 220. Placing the second arm 220 between the pin 238 and the bottom wall 235 of the cross arm 230 also allows the cross arm 230 to be pivotably coupled to the second arm 220, i.e., able to pivot relative to the second arm 220, without being slideably locked to the second arm 220. In some embodiments, the second arm 220 has a ramped section 223 with a pair of ramped surfaces 224A, 224B that are connected by a flat surface 225 defining the maximum height H2 of the second arm 220. The flat surface 225 may have holding openings 226 formed therein that can each accept a respective pin. The pin 238 placed in the pin openings 237A, 237B may be placed between two pins placed in adjacent holding openings 226 to limit the ability of the cross arm 230 to slide along the second arm 220, helping to hold the cross arm 230 in a desired position.

Referring specifically now to FIGS. 3-4, it is illustrated that the cross arm 230 has been released from the first arm 210 and the second arm 220 is nesting within the cross arm 230. The cross arm 230 has also been slidden down the second arm 220 toward the second wheel mount 221. By nesting the second arm 220 within the cross arm 230 and sliding the cross arm 230 down the second arm 220, the overall space profile of the second arm 220 and the cross arm 230 together decreases, resulting in a relatively compact arrangement of the arms 220, 230. In some embodiments, the openings 233A, 233B, which may also be referred to as "cross openings", of the cross arm 230 are configured to align with at least one pair of locking openings 227 of the second arm and accept a pin to lock the cross arm 230 to the second arm 220 together, such as in the compact arrangement so the arms 220, 230 stay in the compact arrangement.

When the arms 220, 230 are nested, the second arm 220 can be pivoted from a transport position, illustrated in FIGS. 2-3, to an operating position, illustrated in FIG. 4. It should be appreciated the second arm 220 can also be pivoted between the transport position and the operating position when the cross arm 230 is not coupled to the first arm 210 and also not nested with the second arm 220. The second arm 220 may be placed in the operating position while the header 100 is operating in a field, and it is desired to keep the second arm 220 and the cross arm 230 off the ground so the arms 220, 230 do not interfere with crop collection. When the second arm 220 is in the operating position with the cross arm 230, the second arm 220 and the cross arm 230 can be held closely to a frame member 103 of the header frame 102. In some embodiments, the second arm 220 and/or the cross arm 230 can be coupled to the frame member 103, using a pin or otherwise, so the second arm 220 and the cross arm 230 are held securely to the frame member 103 while the header 100 is operating. When transporting the header 100, on the other hand, the second arm 220 can be pivoted to the transport position, along with the cross arm 230, so the transport wheels 212, 222 contact the ground to stabilize the header 100 during transport. In this respect, the cross arm 230 is configured to assume the coupling position when the second arm 220 is in the transport position so the cross arm 230 couples the first arm 210 and the second arm 220 together for stability. The cross arm 230 may, for example, be slid by an operator along the second arm 220 to the coupling position so the cross arm 230 can be re-coupled with the first arm 210, coupling the first arm 210 to the second arm 220. Gravity may assist with sliding the cross arm 230 along the second arm 220, reducing the effort an operator needs to exert to slide the cross arm 230 to the coupling position.

It should be appreciated from FIGS. 2-4 that, starting from the transport position of the cross arm 230 illustrated in FIG. 2, the transport wheels 212, 222 can be released from their respective wheel mounts 211, 221. The cross arm 230 can be released from the first arm 210 and slid down the second arm 220, as illustrated in FIG. 3, and the second arm 220 and the cross arm 230 can be pivoted to the operating position when the second arm 220 nests in the cross arm 230 or the second arm 220 can be pivoted to the operating position before moving the cross arm 230 to the nesting position, as illustrated in FIG. 4. The second arm 220 may, for example, be pivotable about a pivot pin 104 that pivotably couples the second arm 220 to a pivot bracket 105 that is mounted to the frame member 103. The cross arm 230 and the second arm 220 can be held together in the compact arrangement by various pins, as previously described, so the arms 220, 230 stay together when held close to the frame member 103 in the operating position. In some embodiments, the arms 220, 230 together extend generally parallel to the frame member 103 when the second arm 220 is pivoted to the operating position and the cross arm 230 is in the nesting position so the arms 220, 230 do not unexpectedly break loose and deploy to the transport position, for example, while the header 100 is collecting crop material. To put the second arm 220 and the cross arm 230 back into position for transport, the second arm 220 can be pivoted to the transport position and the cross arm 230 can be pivoted and slid to the coupling position to re-couple with the first arm 210, i.e., the movement of the arms 220, 230 from the operating position to the transport position is generally the opposite as from the transport position to the operating position. The first arm 210 can similarly be moved between an operating position and a transport position by, for example, pivoting the first arm 210, in a manner similar to the second arm 220 or in a different manner.

From the foregoing, it should be appreciated that the transport assembly 200 provided according to the present disclosure allows an operator to quickly and easily break down and store the transport assembly 200 with the header 100 after transport and, similarly, quickly and easily deploy the transport assembly 200 for transporting the header 100. The components of the transport assembly 200 may all stay with the header 100 when in the operating position, i.e., when not deployed, so the risk of components of the transport assembly 200 being lost during operation is reduced. The transport assembly 200 provided according to the present disclosure can also be relatively economical compared to optional deployment systems, which may include hydraulics, while still allowing the option of using such deployment systems. Further, all components of the transport assembly 200 may be completely connected to a main beam of the header frame 102 to minimize lifting of the components, which may be particularly useful when the cutter 108 is a completely flexible cutterbar that is non-load bearing and cannot stably support the components.

Figure 5:
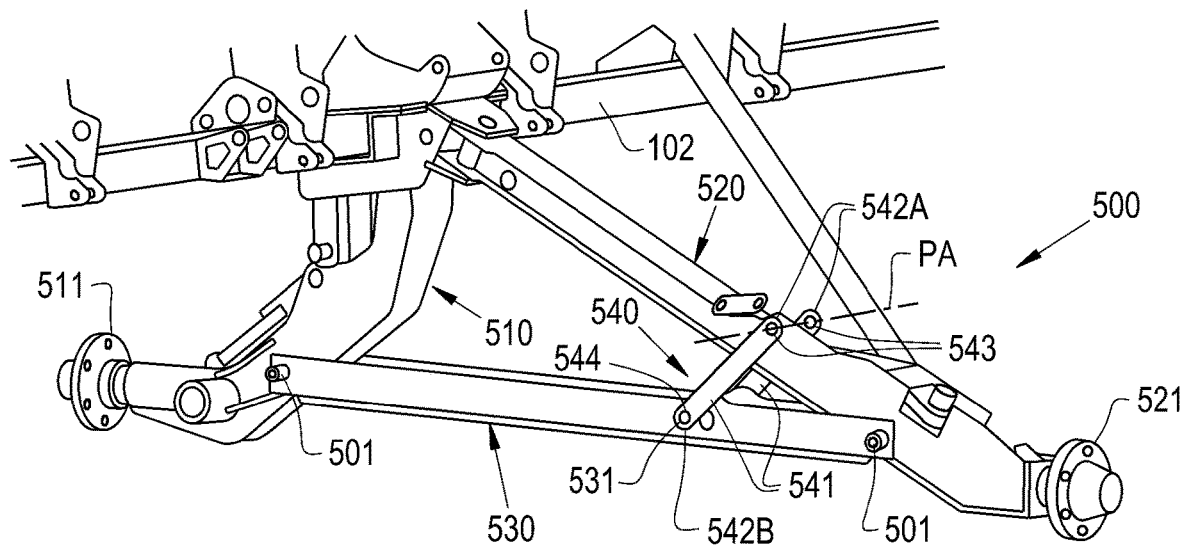
FIG. 5 illustrates another exemplary embodiment of a transport assembly of the header of FIG. 1 in a transport configuration, the transport assembly including a pivot bracket coupling a cross arm to a second arm.
Figure 6:
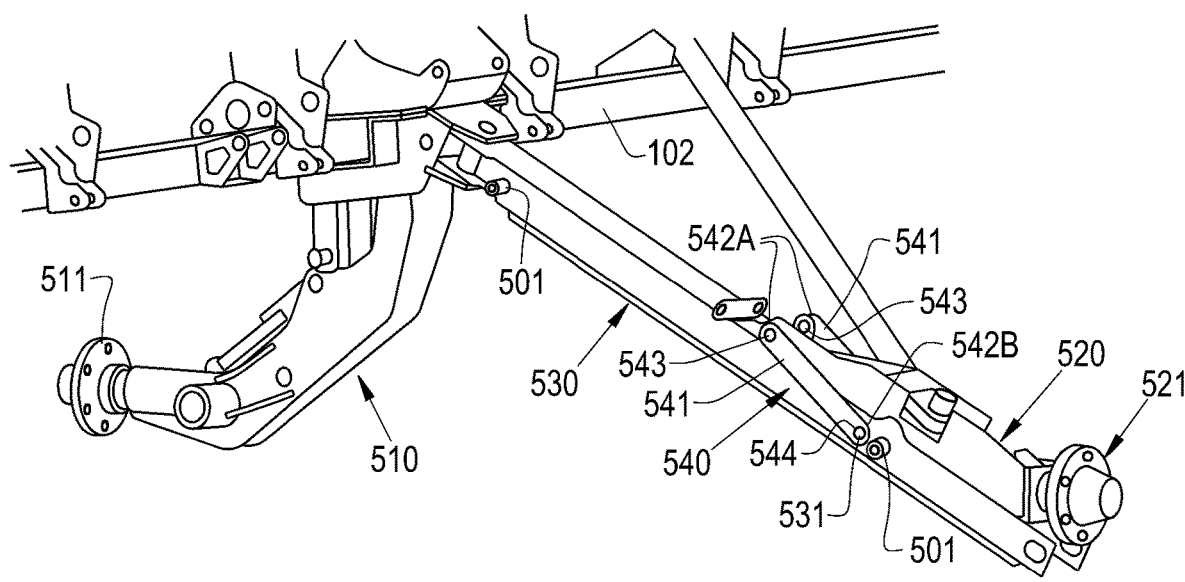
FIG. 6 illustrates the transport assembly of FIG. 5 when the cross arm is in a nesting position.

Referring now to FIGS. 5-6, another exemplary embodiment of a transportation assembly 500 provided according to the present disclosure is illustrated being carried by the header frame 102. The transportation assembly 500 includes a first arm 510 coupled to the header frame 102, a second arm 520 pivotably coupled to the header frame 102, and a cross arm 530 coupling the first arm 510 to the second arm 520. The first arm 510 includes a first wheel mount 511 that is configured to mount a first transport wheel thereto and the second arm 520 includes a second wheel mount 521 that is configured to mount a second transport wheel thereto, similarly to the previous described first arm 210 and second arm 220.

The cross arm 530 coupling the first arm 510 to the second arm 520 is releasably coupled to the first arm 510 such that the cross arm 530 and the second arm 520 are slideable and nestable with one another when the cross arm 530 is uncoupled from the first arm 510, similarly to the previously described cross arm 210. Unlike the previously described transportation assembly 200, the transportation assembly 500 also includes a pivot bracket 540 that is coupled to both the second arm 520 and the cross arm 530 and allows the cross arm 530 to pivot about a pivot axis to slide and nest with the second arm 520. The pivot bracket 540 may include a pair of bracket bars 541 each coupled to both the second arm 520 and the cross arm 530. One end 542A of each bracket bar 541 may be pinned to the second arm 520 by a pair of pins 543, with the pins 543 defining a pivot axis PA of the pivot bracket 540 therethrough. An opposite end 542B of each bracket bar 541 may include a slot 543 that can be placed onto a respective tab 531 on the cross arm 530. The tabs 531 may be, for example, welded to the cross arm 530.

When the cross arm 530 is in the coupling position illustrated in FIG. 5, the second arm 520 is not nesting within the cross arm 530. To nest the second arm 520 within the cross arm 530, the cross arm 530 can be unpinned from both the first arm 510 and the second arm 520 by removing a pair of pins 501 coupling the cross arm 530 to each of the arms 510, 520. Once the pins 501 are removed, the cross arm 530 is free to pivot about the pivot axis PA defined by the pins 543 to the nesting position, which is illustrated in FIG. 6. Once the cross arm 530 is in the nesting position, the pins 501 can be re-inserted into respective openings of the cross arm 530 and the second arm 520 to lock the cross arm 530 in the nesting position so the second arm 520 remains nested within the cross arm 530. When it is desired to move the cross arm 530 back to the coupling position, the pins 501 can be removed before pivoting the cross arm 530 back to the coupling position illustrated in FIG. 5 and pinning the cross arm 530 to the first arm 510 and the second arm 520. The pivot bracket 540 thus simplifies the process of nesting and un-nesting the second arm 520 within the cross arm 530 by anchoring one end of the cross arm 530 to the second arm 520 so a user does not need to support an entirety of the cross arm 530 while moving the cross arm 530 to the various positions; rather, the user can focus on supporting and pinning the opposite end of the cross arm 530 that is coupled to the first arm 510 in the coupling position. In other respects, the transportation assembly 500 may be similar to the previously described transportation assembly 200.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural header for an agricultural vehicle, comprising:

a header frame;
at least one cutter carried by the header frame and configured to cut crop material; and
a transport assembly coupled to the header frame, the transport assembly comprising:
a first arm coupled to the header frame and comprising a first wheel mount configured to mount a first transport wheel thereto;
a second arm pivotably coupled to the header frame and comprising a second wheel mount configured to mount a second transport wheel thereto; and
a cross arm coupling the first arm to the second arm, the cross arm being releasably coupled to the first arm such that the cross arm and the second arm are slideable and nestable with one another when the cross arm is uncoupled from the first arm.

2. The agricultural header of claim 1, wherein the cross arm is pivotably coupled to the second arm and pivotable between a coupling position where the cross arm couples the first arm to the second arm and a nesting position where the second arm nests with the cross arm.

3. The agricultural header of claim 2, wherein the cross arm comprises a pair of opposed sidewalls, the second arm nesting between the sidewalls when the cross arm is in the nesting position.

4. The agricultural header of claim 3, wherein the cross arm comprises a bottom wall coupling the sidewalls together, the second arm contacting the bottom wall when the cross arm is in the nesting position.

5. The agricultural header of claim 3, wherein each of the sidewalls comprises a respective slide section defining a height greater than a maximum height of the second arm, each of the slide sections comprising a respective pin opening that is placed above the second arm.

6. The agricultural header of claim 5, further comprising a pin placed in each of the pin openings of the slide sections.

7. The agricultural header of claim 5, wherein the second arm comprises a ramped section comprising a pair of ramped surfaces that are connected by a flat surface defining the maximum height of the second arm.

8. The agricultural header of claim 2, wherein the second arm is pivotable between an operating position and a transport position and the cross arm is movable to the nesting position when the second arm is in the operating position.

9. The agricultural header of claim 8, wherein the cross arm is configured to assume the coupling position when the second arm is in the transport position.

10. The agricultural header of claim 1, wherein the second arm comprises at least one pair of locking openings and the cross arm comprises at least one pair of cross openings that are configured to align with the at least one pair of locking openings and accept a pin to lock the cross arm to the second arm.

11. An agricultural vehicle, comprising:
a chassis; and
a header carried by the chassis, the header comprising:
a header frame;
at least one cutter carried by the header frame and configured to cut crop material; and
a transport assembly coupled to the header frame, the transport assembly comprising:
a first arm coupled to the header frame and comprising a first wheel mount configured to mount a first transport wheel thereto;
a second arm pivotably coupled to the header frame and comprising a second wheel mount configured to mount a second transport wheel thereto; and
a cross arm coupling the first arm to the second arm, the cross arm being releasably coupled to the first arm such that the cross arm and the second arm are slideable and nestable with one another when the cross arm is uncoupled from the first arm.

12. The agricultural vehicle of claim 11, wherein the cross arm is pivotably coupled to the second arm and pivotable between a coupling position where the cross arm couples the first arm to the second arm and a nesting position where the second arm nests with the cross arm.

13. The agricultural vehicle of claim 12, wherein the cross arm comprises a pair of opposed sidewalls, the second arm nesting between the sidewalls when the cross arm is in the nesting position.

14. The agricultural vehicle of claim 13, wherein the cross arm comprises a bottom wall coupling the sidewalls together, the second arm contacting the bottom wall when the cross arm is in the nesting position.

15. The agricultural vehicle of claim 13, wherein each of the sidewalls comprises a respective slide section defining a height greater than a maximum height of the second arm, each of the slide sections comprising a respective pin opening that is placed above the second arm.

16. The agricultural vehicle of claim 15, further comprising a pin placed in each of the pin openings of the slide sections.

17. The agricultural vehicle of claim 15, wherein the second arm comprises a ramped section comprising a pair of ramped surfaces that are connected by a flat surface defining the maximum height of the second arm.

18. The agricultural vehicle of claim 12, wherein the second arm is pivotable between an operating position and a transport position and the cross arm is movable to the nesting position when the second arm is in the operating position.

19. The agricultural vehicle of claim 18, wherein the cross arm is configured to assume the coupling position when the second arm is in the transport position.

20. The agricultural vehicle of claim 11, wherein the second arm comprises at least one pair of locking openings and the cross arm comprises at least one pair of cross openings that are configured to align with the at least one pair of locking openings and accept a pin to lock the cross arm to the second arm.

* * * * *